United States Patent [19]
Legnaioli

[11] 3,978,395
[45] Aug. 31, 1976

[54] VARIABLE VOLTAGE DEVICES

[76] Inventor: Luciano Legnaioli, Via Giambologna 5, Florence, Italy, I-50132

[22] Filed: Mar. 6, 1975

[21] Appl. No.: 555,826

[30] Foreign Application Priority Data
Mar. 11, 1974 Italy .................................. 9368/74

[52] U.S. Cl. .......................... 323/43.5 R; 323/45; 323/47
[51] Int. Cl.² ........................................ G05F 1/14
[58] Field of Search ............... 323/43.5 R, 43.5 S, 323/45, 47, 48

[56] References Cited
UNITED STATES PATENTS

| | | |
|---|---|---|
| 2,884,587 | 4/1959 | Hanthorn et al. .................. 323/47 |
| 2,916,734 | 12/1959 | Spencer ........................ 323/48 X |
| 3,195,038 | 7/1965 | Fry ............................ 323/43.5 S |
| 3,255,403 | 6/1966 | Beaver et al. ................... 323/48 X |
| 3,458,797 | 7/1969 | Larsen ........................... 323/48 X |
| 3,619,764 | 11/1971 | Brennan ...................... 323/43.5 R |
| 3,652,824 | 3/1972 | Okada ........................... 323/48 X |

*Primary Examiner*—A. D. Pellinen
*Attorney, Agent, or Firm*—McGlew and Tuttle

[57] ABSTRACT

A variable voltage device is in the form of a transformer in which the secondary windings are arranged in two identical sets connected to operate in tandem. Each set includes a plurality of winding groups which are connected in series by switching devices. The switching devices can be operated to connect in or cut out a selected group or groups of windings from the series. The tandem operation of the two switching devices is delayed so that switching occurs in only one set at any one instant.

5 Claims, 6 Drawing Figures

VARIABLE VOLTAGE DEVICES

BACKGROUND OF THE INVENTION

1. Field of the invention

The present invention relates to variable voltage devices.

2. Description of the prior art

Previously proposed variable voltage devices have included electrical transformers in which the primary to secondary winding turns ratio can be varied by means of sliding brushes.

In these devices the turns of the outer winding are without any insulation over a circumferentially extending area and graphite brushes are slidably mounted to slidably engage the outer winding along the circumferentially extending area. The turns ratio between the two windings of the transformer is thus dependent on the position of the brushes. Such devices are unsuitable for delivering high power because the current which the brushes can support or withstand and the permissible voltage step between adjacent turns are, in practice, limited.

It is an object of the invention to provide a variable voltage device capable of delivering high power.

SUMMARY OF THE INVENTION

According to the invention there is provided a variable voltage device, comprising a transformer core, primary windings wound on the core, secondary windings wound on the core, the secondary windings being arranged in first and second similar sets each containing a plurality of groups of turns, output terminal means, means connecting the two sets to feed the output terminal means with voltages having the same phase, first switch means for interconnecting the groups of turns of the first set in series and operable to switch into, or cut out from, this series selected one or ones of the groups, and second switch means interconnecting the groups of turns of the second set in series and operable to switch into or cut out from, this latter series a selected one or ones of the groups.

According to the invention there is further provided a variable voltage device comprising a transformer core, a primary winding wound on the core, a secondary winding wound on the core, the secondary winding being arranged in first and second similar sets each containing a plurality of groups of turns, the numbers of turns of the groups in each set being inter-related in accordance with a progressive geometric sequence, output terminal means, means connecting the two sets to feed the output terminal means with voltages having the same phase, first switch means for interconnecting the groups of turns of the first set in series and operable to switch into, or cut out from, this series selected one or ones of the groups, second switch means for interconnecting the groups of turns of the second set in series and operable to switch into, or cut out from, the second set series selected one or ones of the groups, and control means for controlling the operation of the second switch means so that it follows successive switching actions of the first switch means but only after a predetermined delay, so that switching does not occur in the two switching means simultaneously.

BRIEF DESCRIPTION OF THE DRAWINGS

A three phase variable voltage device embodying the invention will now be described by way of example with reference to the accompanying diagrammatic drawings in which:

FIGS. 3 and 3A are graphs illustrating the operation of the one phase of the device of FIG. 2;

DESCRIPTION OF THE PREFERRED EMBODIMENT

Figure 1:
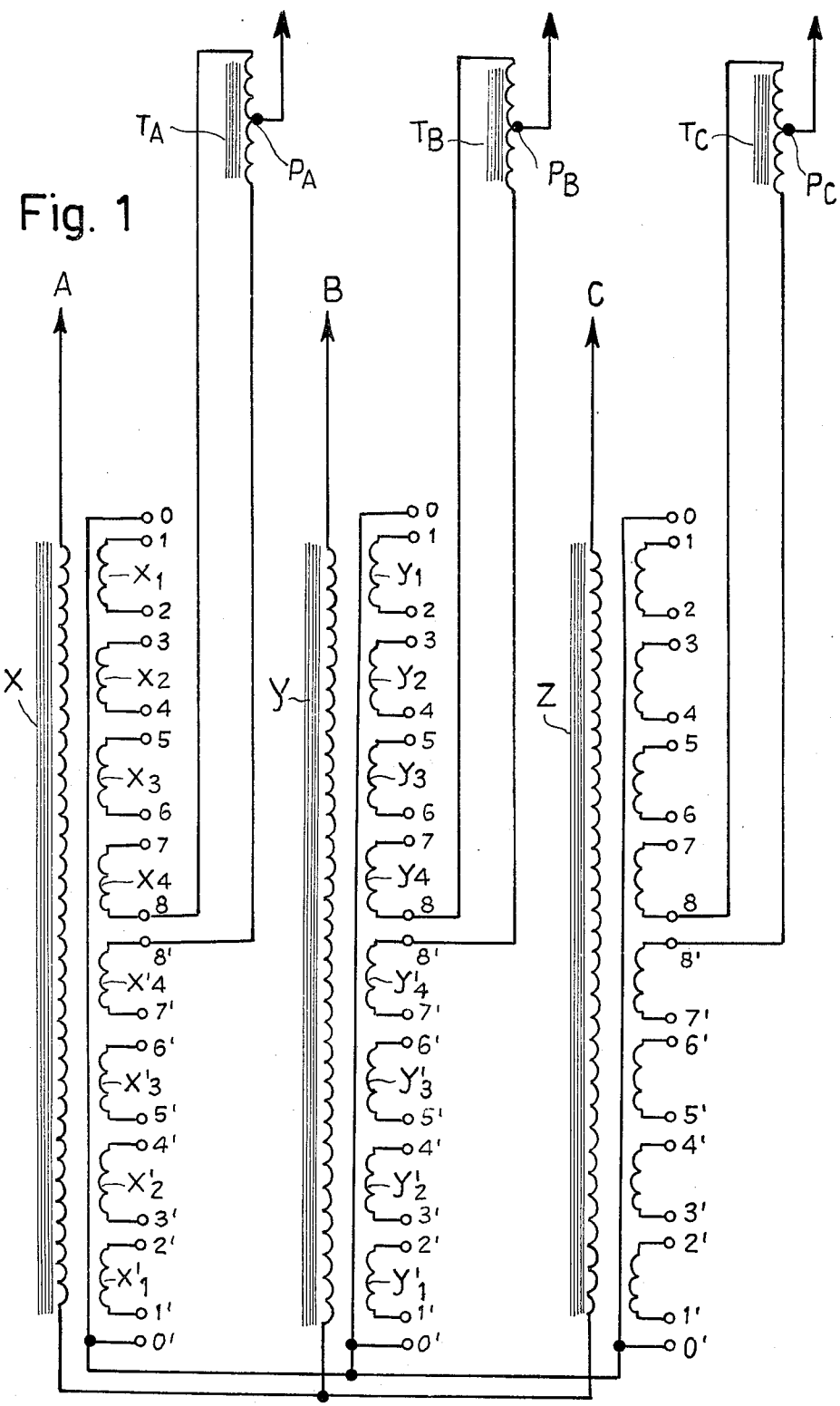
FIG. 1 is a circuit diagram of a three-phase star connected transformer of the device.
Figure 2:
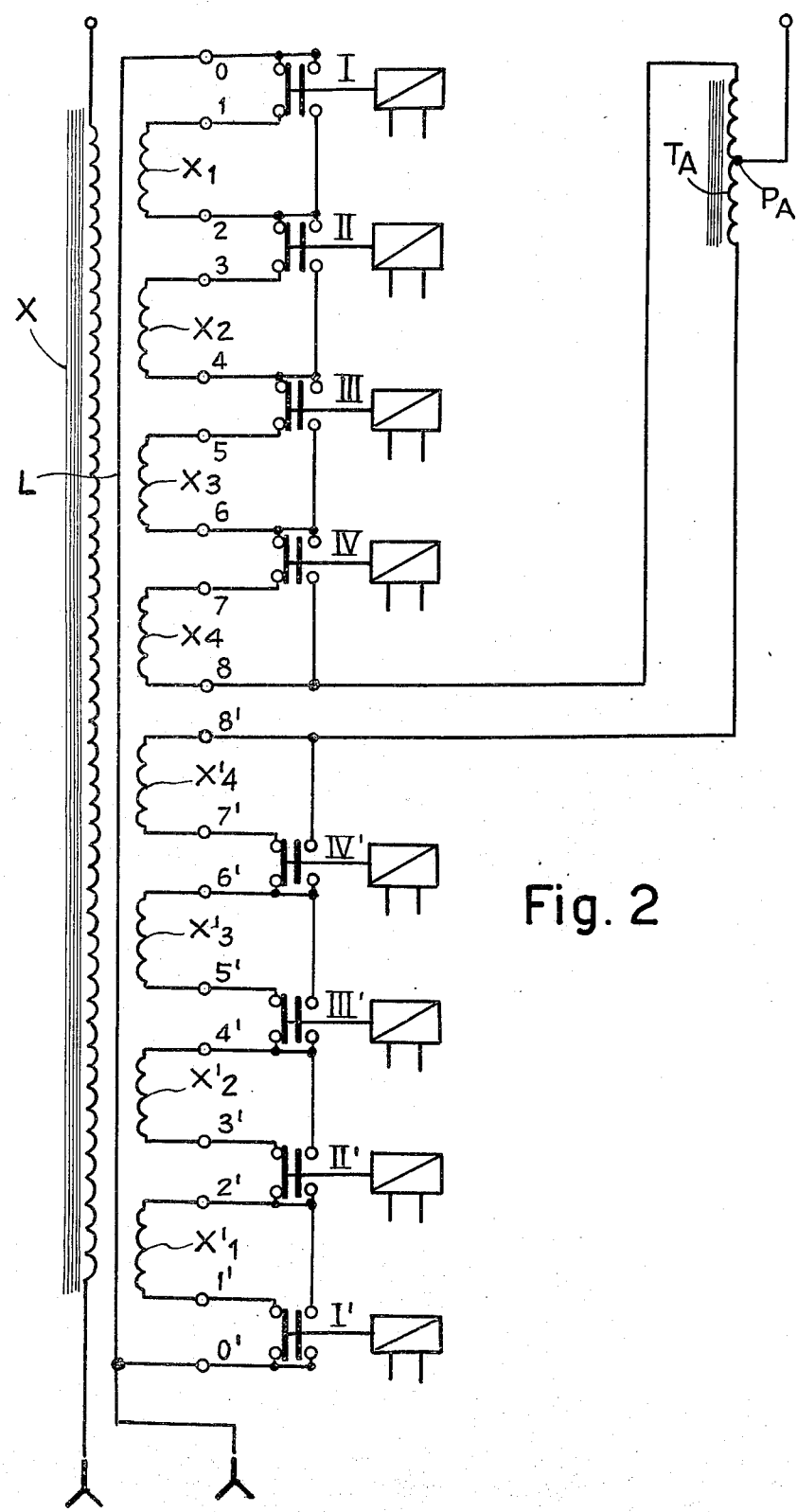
FIG. 2 illustrates a circuit diagram of one phase of the device.

The variable voltage device shown in FIGS. 1 and 2 includes a transformer having multiple fixed taps and a group of switches capable of switching high currents. These switches can be electromechanical or electronic.

The transformer which is shown in FIG. 1 includes a magnetic core having three limbs X, Y, Z, and three primary windings, one winding wound on each of the limbs. The three primary windings are star-connected and have respective input terminals A, B, C. Each limb carries a secondary winding divided into two sets of four groups of turns each. Thus the limb X carries the groups of turns X1, X2, X3, X4 in one set and the groups of turns X'1 X'2, X'3, X'4 in the other set, the limb Y carries the groups of turns Y1, Y2, Y3, Y4 in one set and the groups of turns Y'1, Y'2, Y'3, Y'4 in the other set, and the limb Z carries similar turns. The groups X1, X2, X3, X4 of one set wound on the limb X are provided with respective pairs of output terminals 1,2; 3,4; 5,6; 7,8. The groups X'1, X'2, X'3, X'4 of the other set wound on the limb X are provided with respective pairs of output terminals 1',2'; 3',4'; 5',6'; 7',8'.

The groups in each set which are referenced by the same subscript have the same number of turns. Thus the group $X_1$ has the same number of turns as the group $X_1'$. However the groups which are referenced with a prime are wound in the opposite sense to the groups without a prime. Thus the group $X_1$ is wound on the limb X in the opposite sense to the group $X_1'$. The number of turns of each group in each set is not the same, but the number of turns are arranged so that the number of turns of the groups in the same set are in the binary ratio 1: 2: 4: 8. Thus the number of turns of the groups X4 and X'4 is twice that of the groups X3 and X'3. The number of turns of the groups $X_3$ and $X'_3$ is twice that of the groups X2 and X'2. The number of turns of the groups $X_2$ and $X_2'$ is twice that of the groups $X_1$ and $X_1'$.

FIG. 2 shows the windings wound on the limb X (and constituting the phase A) in more detail and in particular illustrates the interconnection of groups of the secondary winding.

As shown in FIG. 2, electromagnetically operated switches I, II, III, IV and I', II', III', IV', are provided to switch respective groups $X_1$, $X_2$, $X_3$, $X_4$ and $X_1'$, $X_2'$, $X_3'$, $X_4'$ into, or out of, the secondary winding. Moreover the two sets of groups are connected in parallel with one another by means of a link L interconnecting the terminals O and O' of the switches I and I' and by means of a winding $T_A$ of an equalizing transformer interconnecting the terminals 8 and 8' of the windings $X_4$ and $X_4'$. The equalizing transformer has two other windings $T_B$ and $T_C$ which are connected to the secondary windings in respective limbs Y and Z in a similar manner. Each of the windings $T_A$, $T_B$ and $T_C$ has a respective center tap $P_A$, $P_B$ and $P_C$, and these three center taps constitute the three outputs of the secondary windings. The links L in the three secondary windings are interconnected so that the secondary windings are star-connected.

As will be seen from FIG. 2, each switch is operative to switch in or cut out its corresponding winding group. Thus, for example, in one position the switch I interconnects the terminals 0 and 1 to switch in the group $X_1$ while in its other position the switch I interconnects terminal 0 and 2 to cut out the group $X_1$, and the switch III in one position interconnects the terminals 4 and 5 to switch in the group $X_3$ while in its other position it interconnects the terminals 4 and 6 to cut out the groups $X_3$.

In operation in order to obtain a gradual variation in the effective number of turns of the secondary winding, and thus of the output voltage, the switches must be operated in a predetermined sequence. This predetermined sequence is set out in the following Table and illustrated in FIG. 3.

TABLE

| Cycle | Semi-cycle | No. of fifteenths of the maximum output voltage provided by the first set of groups | No. of fifteenths of the maximum output voltage provided by the second set of groups | No. of fifteenths of the maximum output voltage appearing at the output of transformer $T_A$ | No. of fifteenths of the maximum output voltage at the output terminal $P_A$ |
|---|---|---|---|---|---|
| 1 | I | 1 | 0 | ½ | 0.5 |
| 1 | II | 1 | 1 | 0 | 1.0 |
| 2 | I | 2 | 1 | ½ | 1.5 |
| 2 | II | 2 | 2 | 0 | 2.0 |
| 3 | I | 3 | 2 | ½ | 2.5 |
| 3 | II | 3 | 3 | 0 | 3.0 |
| 4 | I | 4 | 3 | ½ | 3.5 |
| 4 | II | 4 | 4 | 0 | 4.0 |
| 5 | I | 5 | 4 | ½ | 4.5 |
| 5 | II | 5 | 5 | 0 | 5.0 |
| 6 | I | 6 | 5 | ½ | 5.5 |
| 6 | II | 6 | 6 | 0 | 6.0 |
| 7 | I | 7 | 6 | ½ | 6.5 |
| 7 | II | 7 | 7 | 0 | 7.0 |
| 8 | I | 8 | 7 | ½ | 7.5 |
| 8 | II | 8 | 8 | 0 | 8.0 |
| 9 | I | 9 | 8 | ½ | 8.5 |
| 9 | II | 9 | 9 | 0 | 9.0 |
| 10 | I | 10 | 9 | ½ | 9.5 |
| 10 | II | 10 | 10 | 0 | 10.0 |
| 11 | I | 11 | 10 | ½ | 10.5 |
| 11 | II | 11 | 11 | 0 | 11.0 |
| 12 | I | 12 | 11 | ½ | 11.5 |
| 12 | II | 12 | 12 | 0 | 12.0 |
| 13 | I | 13 | 12 | ½ | 12.5 |
| 13 | II | 13 | 13 | 0 | 13.0 |
| 14 | I | 14 | 13 | ½ | 13.5 |
| 14 | II | 14 | 14 | 0 | 14.0 |
| 15 | I | 15 | 14 | ½ | 14.5 |
| 15 | II | 15 | 15 | 0 | 15.0 |

Figure 3:
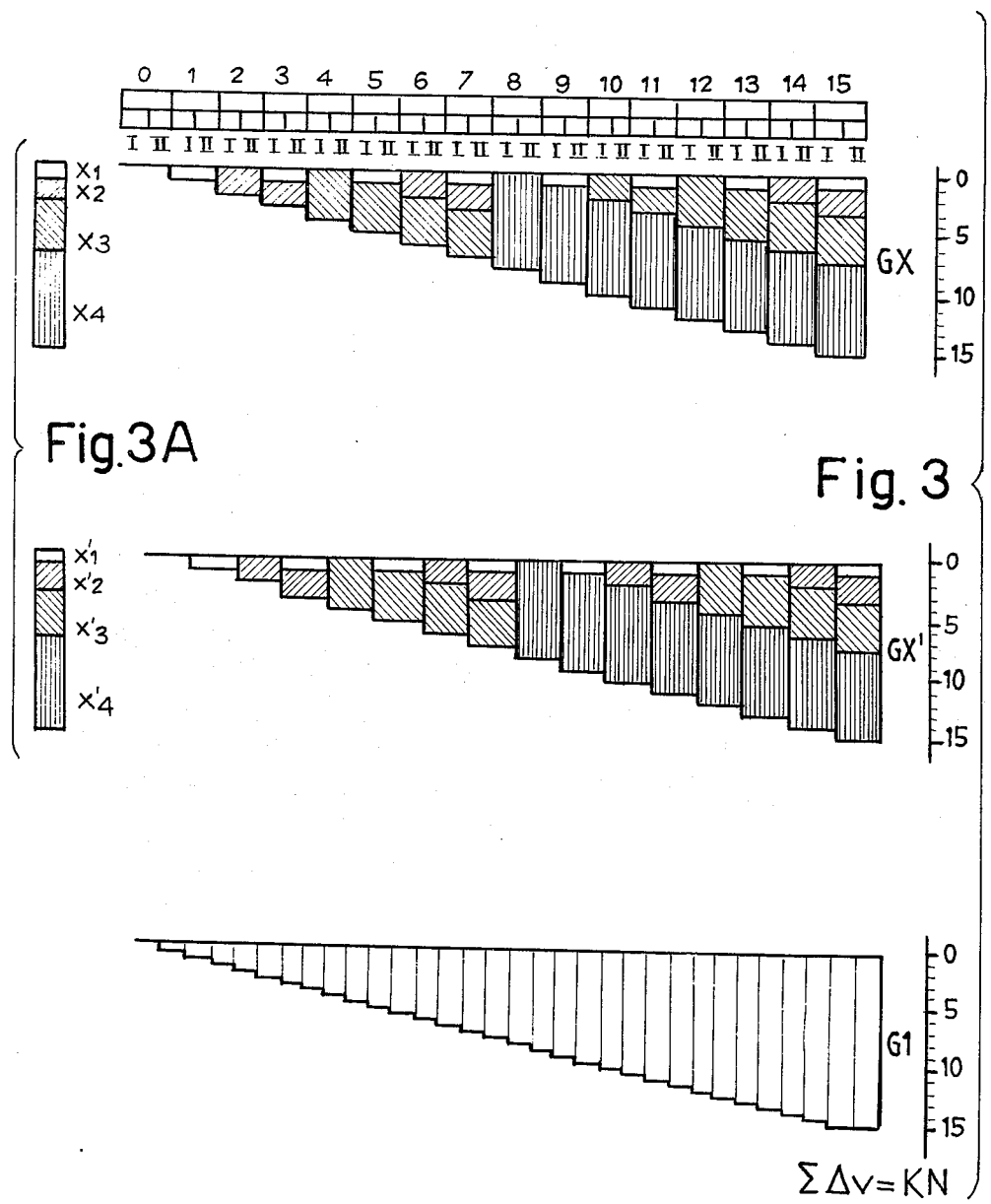

The time required to step up the output voltage from a minimum to a maximum value is divided into fifteen periods or cycles, each of which has two semi-periods or semi-cycles. These divisions appear along the ordinate axis in FIG. 3. Plotted along the abscissae axes are the winding groups in each of the two sets (which are respectively referred to as GX and GX') which are switched into the secondary winding at any instant. The differences in the heights of the plots as measured along the abscissae axes correspond to the differences in the number of turns of the groups. FIG. 3A illustrates the relative numbers of turns of the four groups of windings in the two sets GX and GX'.

FIG. 3 and the Table illustrate how it is possible to vary the output voltage delivered by the secondary winding in fifteen steps, using only eight switches for each limb. Bearing in mind that the number of turns of each group in each set is proportional to the values 1-2-4-8, it will be appreciated that the effective number of turns in each set can be varied between the total number of turns of the set and one fifteenth of the total number of turns in 15 steps having equal increments. Thus if the set containing the groups $X_1$ and $X_4$ is switched in the first half of each cycle (that is in semi-cycle I) and the set containing the groups $X_1'$ to $X_4'$ is switched in the second half of each cycle, (that is in semi-cycle II) the output voltage from the secondary winding can be varied in 30 increment steps, as shown by the characteristic g1 in FIG. 3.

From the Table and FIG. 3, it will be seen, for example, that during the seventh cycle in one set of windings, the groups X1, X2, X3 are switched into the secondary winding thus providing seven (1+2+4) fifteenths of the total number of turns in the set. Accordingly the voltage delivered by this set is equal to seven fifteenths of the maximum voltage. However, during the first half of the cycle only the groups $X_2'$ and $X_3'$ of the second set are switched into the secondary winding and these only provide six (2+4) fifteenths of the total number of turns in the set. Accordingly the voltage delivered by this set is six fifteenths of the maximum voltage. As a result, the net voltage of the output of the secondary winding during the first half of the seventh cycle is six and a half fifteenths of the maximum voltage. However, during the second half of the seventh cycle the group $X_1'$ is switched into the second set, thus bringing the net output voltage of the secondary winding up to seven fifteenths of the maximum value.

Considering the ninth cycle as another example, the turns of the first set of groups correspond to nine fifteenths of the total during the semi-cycle I of period 9, only the groups X4 and X1 being switched in while the turns of the second set of groups correspond to eight fifteenths of the total, as only the group X'4 is switched in. As the maximum deliverable voltage by the two groups of turns is equal, there is a voltage difference $\Delta V$ between the outputs of the two sets. The voltage difference $\Delta V$ corresponds to one step. This voltage $\Delta V$ is applied across the winding of the equalizer transformer $T_A$ which will provide at its centre tap a voltage of ½ $\Delta V$. This voltage is added to that produced by the second set and subtracted from that produced by the first set. Thus during the semi-cycle I of the period 9, the voltage delivered to the output terminal $P_A$ corresponds to eight and half fifteenths of the maximum value.

During the semi-cycle II of period 9, the turns of the two sets of groups are equal and correspond to nine fifteenths of the total. The voltage difference $\Delta V$ applied across the equalizing transformer $T_A$ is therefore nil and so the total voltage at the output $P_A$ corresponds to nine fifteenths of the total.

In this manner, the voltage output of the secondary winding can be varied in 30 steps, as illustrated by the characteristic G1 of FIG. 3.

The Table clearly illustrates the sequence in which the output voltage of the secondary winding is varied between its minimum and maximum value. In the Table, the first column indicates the 15 time intervals during which switching takes place. The second column indicates the two semiperiods into which each period is divided. The third column and the fourth column respectively give the number of fifteenths of the maximum output voltage provided by the first and second sets. The fifth column gives the number of fifteenths of the maximum output voltage delivered by the equalizing transformer. The value fluctuates between nil if the two sets provide the same output voltage and one-half if the two sets provide different voltages. The sixth column gives the number of fifteenths of the maximum output voltage which appears at the output terminal $P_A$.

It will be appreciated that, while each set has been described as having four groups of windings to provide 30 steps, each set can have five groups of windings, the turns ratio between the windings being 1-2-4-8-16. In this way, the windings will provide 62 steps. Thus by further increasing the number of groups in the manner described, the fineness of the voltage adjustment can be increased.

It will be appreciated that, in the described device, switching takes place in only one set at a time so that there is no interruption in the power supplied at the output. Furthermore at the instant of the switching, the current which is to be interrupted by the contacts of the switches is about half the delivered current. This consequently reduces wear of the contacts. Since electromagnetic switches can carry a higher current and sustain a higher voltage differential than graphite brushes, the device can be used to control higher powers than transformers with graphite brushes. Furthermore since the electromagnetic switches can be operated at a higher speed than that with which graphite brushes can be displaced, the device described can effect a desired voltage variation at a speed much higher than that obtainable by sliding brush transformers.

The sequence of operation of the switches is controlled by a control system in accordance with a predetermined program. The control system can take the form of a mechanical cam arrangement or a binary electronic switching arrangement.

Figure 4:
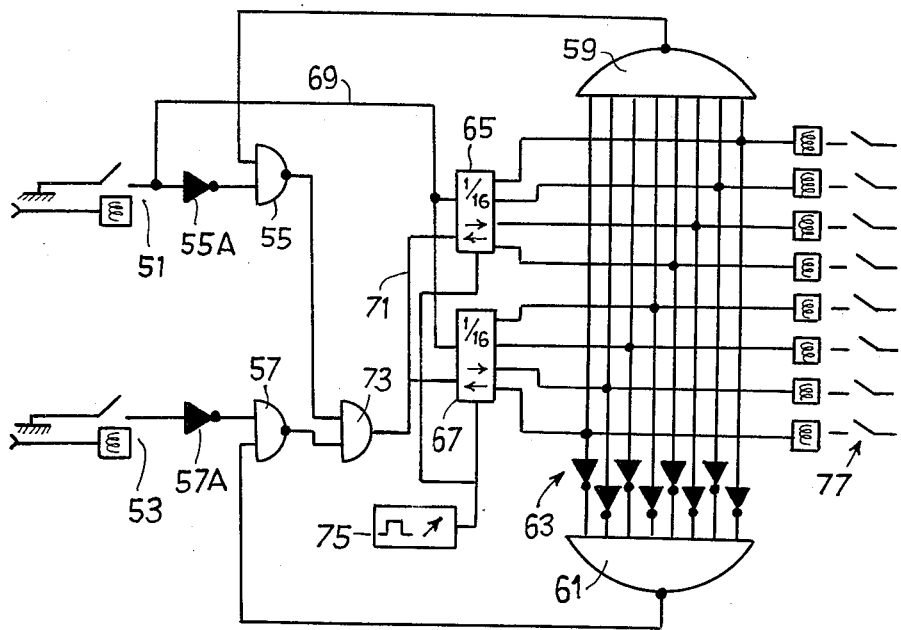
FIG. 4 shows a block diagram of the central system of the switches of the device of FIG. 2.

FIG. 4 shows a block diagram of an electronic control system for controlling the electromagnetic switches I, II, III, IV, and I', II', III', IV'. The system includes two switches 51 and 53 which are arranged to be operated by means (not shown) sensing the output voltage from the output terminals of the secondary windings. If the voltage sensed is higher than a desired value the switch 53 is operated until the voltage falls back to the desired value. If the voltage is less than the desired value the switch 51 is operated until the voltage rises to the desired value. The system includes two inverters 55A and 57A which are connected to ground through the switches 51 and 53 and to NAND gates 55 and 57, each having one input supplied from the output of a respective inverter 55A and 57A. The outputs from the two NAND gates feed corresponding ones of two inputs of an AND gate 73. The output from the AND gate 73 is applied to one input of each of two reversible binary counters 65 and 67. The other input of each of the two reversible counters is connected to the junction between the switch 51 and the inverter 55A. The two counters 65 and 67 are supplied with pulses from a clock pulse generator 75 (for example a square wave multivibrator), the pulses to the counter 65 being delayed by half a cycle with respect to the pulses supplied to the counter 67. Each counter has four output lines which are connected by a matrix interconnection network to respective ones of eight inputs of a NAND gate 59, through corresponding inverters 63 to respective ones of eight inputs of a NAND gate 61 and to the energising coils of respective ones of eight electromagnets. The electromagnets control an assembly 77 of eight switches which in turn control the operation of the electromagnetic switches I to IV and I' and IV'.

In explaining the operation, it will be assumed initially that the count by the two counters is such that only some of their output lines are energised and consequently only selected ones of the groups of windings in the two sets are energised. Under these conditions the output from each NAND gate 59 and 61 will be a binary '1' and thus a binary 1 will be applied to one input of each gate 55 and 57. Assuming that both switches 51 and 53 are open, then the inverters 55A and 57A will apply a binary '0' to the other input of each NAND gate 55 and 57 and as a result the output from both NAND gates 55 and 57 will be binary 1's.

These binary 1's are applied to the AND gate 73 which in turn will apply a binary 1 to inhibit the counting operation of the two counters.

If now for some reason the output from the transformer rises, the means sensing this will close the switch 53. Closure of the switch 53 will thereupon change the binary 0 at the input of the NAND gate 57 to a binary 1. The output of the NAND gate 57 will thereupon change to a binary 0 causing the AND gate in turn to change to a binary 0. The counters 65 and 67 being no longer inhibited will start counting down. This will cause groups of windings to be switched out of the secondary windings and the output of the transformer to drop. As soon as the output voltage reaches the desired voltage the switch 53 will be opened and the counting by the counters inhibited. If, however, the counter reaches zero count before the desired voltage is reached the output of the NAND gate 61 will change from a binary 1 to a binary 0 thereby causing the NAND gate 57 and AND gate 73 to change again so as to inhibit further counting.

If the output voltage falls, the switch 51 will close and as a result a signal will be applied along the line 69 to reverse the direction of count of the counters 65 and 67. The NAND gate 55 and AND gate 73 will operate in a manner similar to that described above to increase the output voltage of the transformer. Again if the maximum counts of the counters are reached before the desired voltage is achieved, the output of the NAND gate 59 will change from a binary 1 to a binary 0 and through the NAND gate 55 and AND gate 73 inhibit further counting by the counters.

It will thus be appreciated that the NAND gates 59 and 61 act as limit switches.

It will also be appreciated that the pulse repetition rate of the clock pulse generator can be varied to the extent that the maximum possible speed of operation of the switches will allow.

Figure 5:
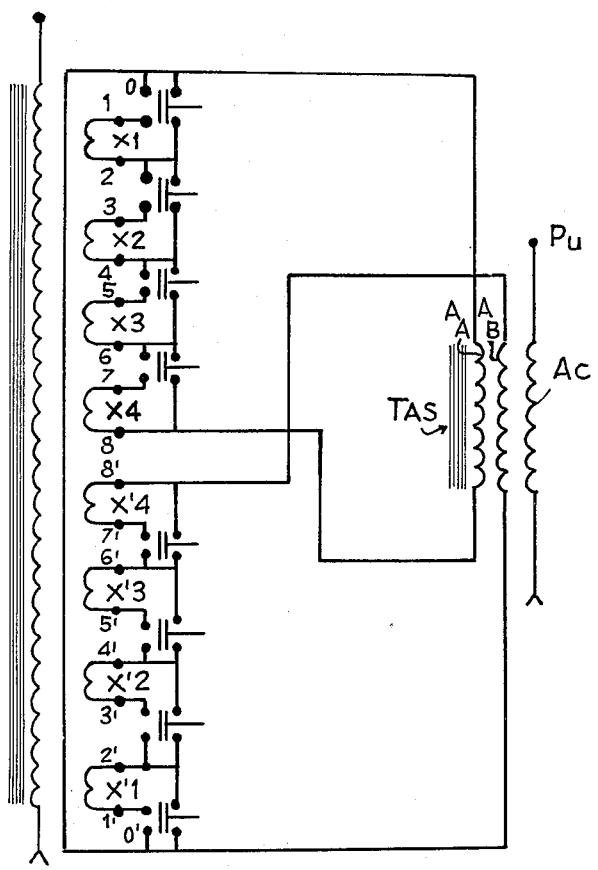
FIG. 5 shows a modification of the device of FIGS. 2 and 4.

In a modification of the variable voltage device of FIG. 2, the equalizing transformer $T_A$ is replaced by a modified equalizing transformer TAS as shown in FIG. 5. The transformer TAS has three windings $A_A$, $A_B$, and $A_C$. The winding $A_A$ is connected across the output of the set containing groups $X_1$ to $X_4$, the winding $A_B$ is connected across the output of the set containing groups $X_1'$ to $X_4'$ and the third winding $A_C$ is connected at one end to an output terminal Pu and at the other end to the star point to which similar windings in the two other phases are connected.

The operation of the device is substantially similar to that described in connection with FIG. 2.

In a modification each set of windings includes at least one group which is permanently in circuit and has no associated switch to switch the group in and out of the set.

Many modifications can be made to the invention without departing from the spirit and scope of the invention as defined by the appended claims.

I claim:

1. A variable voltage device, comprising a transformer core, primary windings wound on said core, secondary windings wound on said core, the secondary windings being arranged in first and second similar sets each containing a plurality of groups of turns, output terminal means, means connecting the two sets to feed the output terminal means with voltages having the same phase; first switch means for interconnecting the groups of turns of the first set in series and to switch into, or cut out from, the said series selected one or ones of said groups, second switch means interconnecting the groups of turns of the second set in series and operable to switch into, or cut out from the said series a selected one or ones of said groups, and control means operative to control the operation of said switch means in accordance with a predetermined program, the program being such that the groups in each set are cyclically switched in and switched out at a predetermined rate, said control means being such that the switching operations by the first and second switch means are phase displaced from one another by one half of the switching cycle.

2. A device according to claim 1, wherein said connecting means includes
   a link interconnecting one end of one of the two sets of windings to the corresponding end of the other winding set, and
   an equalising transformer having a winding which interconnects the other ends of the two sets of windings.

3. A device according to claim 1, wherein said connecting means comprises a second transformer having a first primary winding connected to said first set of windings,
   a second primary winding connected to said second set of windings, and
   a secondary winding connected to said output terminal means.

4. A variable voltage device comprising
   a transformer core,
   a primary winding wound on said core,
   a secondary winding wound on said core, the secondary winding being arranged in first and second similar sets each containing a plurality of groups of turns, the numbers of turns of the groups in each set being interrelated in accordance with a progressive geometric sequence,
   output terminal means,
   means connecting the two sets to feed the output terminal means with voltages having the same phase,
   first switch means for interconnecting the groups of turns of the first set in series and operable to switch into, or cut out from, the said series selected one or ones of the groups,
   second switch means for interconnecting the groups of turns of the second set in series and operable to switch into, or cut out from, the said series selected one or ones of the groups, and
   control means for controlling the operation of the second switch means so that it follows successive switching actions of the first switch means but only after a predetermined delay, so that switching does not occur in the two switching means simultaneously.

5. A device according to claim 4, wherein said control means includes
   means responsive to a first signal to switch the first switching means in a sense so that the output voltage from the first set progressively increases at a substantially uniform rate, and
   means responsive to a second signal to switch the first switching means in a sense so that the output voltage from the first set progressively decreases at a substantially uniform rate.

* * * * *